United States Patent
Reich et al.

(10) Patent No.: US 11,926,350 B2
(45) Date of Patent: Mar. 12, 2024

(54) DEVICE AND METHOD FOR DISPENSING A FRICTION-COEFFICIENT-OPTIMIZING MIXTURE

(71) Applicant: NOWE GMBH, Elze (DE)

(72) Inventors: Alexander Reich, Meerbusch (DE); Luc George Imbert, Turin (IT); Matteo Frea, Turin (IT)

(73) Assignee: NOWE GMBH, Elze (DE)

(*) Notice: Subject to any disclaimer, the term of this patent is extended or adjusted under 35 U.S.C. 154(b) by 859 days.

(21) Appl. No.: 16/967,968

(22) PCT Filed: Mar. 4, 2019

(86) PCT No.: PCT/EP2019/055259
§ 371 (c)(1),
(2) Date: Aug. 6, 2020

(87) PCT Pub. No.: WO2019/170574
PCT Pub. Date: Sep. 12, 2019

(65) Prior Publication Data
US 2020/0361499 A1  Nov. 19, 2020

(30) Foreign Application Priority Data
Mar. 5, 2018  (AT) .............................. A 50181/2018

(51) Int. Cl.
*B61C 15/10*  (2006.01)
*B61C 17/08*  (2006.01)
(Continued)

(52) U.S. Cl.
CPC .......... *B61C 15/102* (2013.01); *B61C 15/107* (2013.01); *B61C 17/08* (2013.01);
(Continued)

(58) Field of Classification Search
CPC ....... B61C 15/10; B61C 15/102; B61C 17/08; B61K 3/02; B60B 39/02;
(Continued)

(56) References Cited

U.S. PATENT DOCUMENTS 4,750,680 A * 6/1988 Shigeura ............... B60B 39/086
291/47
5,477,941 A * 12/1995 Kumar .................. B61C 15/107
184/6
(Continued)

FOREIGN PATENT DOCUMENTS

AT  515059 B1  8/2015
CA  2827702 A1 * 3/2014 ............... B61K 3/02
(Continued)

OTHER PUBLICATIONS

International Preliminary Report on Patentability, dated Sep. 8, 2020, with Written Opinion, for PCT/EP2019/055259, filed Mar. 4, 2019 (English translation).
(Continued)

*Primary Examiner* — Zachary L Kuhfuss
*Assistant Examiner* — James William Jones
(74) *Attorney, Agent, or Firm* — The Small Patent Law Group LLC; Christopher R. Carroll

(57) ABSTRACT

A device and method for dispensing a friction-coefficient-optimizing mixture of at least one lubricant and at least one grit into the gap between a rail wheel of a rail vehicle and a rail. The device includes a reservoir for the lubricant, a reservoir for the grit, a metering unit for metering the lubricant, a metering unit for metering the grit, a delivery apparatus for delivering the lubricant, a delivery apparatus for delivering the grit, and a common dispensing nozzle. The apparatus for delivering the lubricant and the apparatus for delivering the grit are separate from each other and end in
(Continued)

the common dispensing nozzle, the friction-coefficient-optimizing mixture therefore not being formed until the dispensing, and an additional compressed air line is provided, which ends in the common dispensing nozzle.

20 Claims, 2 Drawing Sheets

(51) Int. Cl.
*B61K 3/02* (2006.01)
*E05B 47/00* (2006.01)
*F16N 13/16* (2006.01)
*F16N 15/02* (2006.01)
*G06F 12/06* (2006.01)
*G07C 9/00* (2020.01)

(52) U.S. Cl.
CPC ............... *B61K 3/02* (2013.01); *E05B 47/00* (2013.01); *F16N 13/16* (2013.01); *F16N 15/02* (2013.01); *G06F 12/0669* (2013.01); *G06F 12/0684* (2013.01); *G07C 9/00912* (2013.01); *E05B 2047/0071* (2013.01); *F16N 2270/20* (2013.01); *F16N 2280/02* (2013.01); *F16N 2280/04* (2013.01)

(58) Field of Classification Search
CPC .......... B60B 39/021–025; B60B 39/04; B60B 39/08; B60B 39/083; B60B 39/10; E01C 19/205; F16N 13/16; F16N 15/02; F16N 2270/20; F16N 2280/02; F16N 2280/04
USPC ........................................................ 291/11.2
See application file for complete search history.

(56) References Cited

U.S. PATENT DOCUMENTS

| | | | |
|---|---|---|---|
| 5,896,947 | A | 4/1999 | Kumar |
| 8,500,177 | B2 | 8/2013 | Bartling |
| 2002/0157901 | A1* | 10/2002 | Kast ........................ B61K 3/02 184/3.2 |
| 2014/0151460 | A1* | 6/2014 | Noffsinger .............. B61C 15/10 239/69 |
| 2016/0244074 | A1* | 8/2016 | Krismanic ............... B61C 15/10 |
| 2016/0264153 | A1* | 9/2016 | Bartling ............. B65G 53/4616 |
| 2016/0332639 | A1* | 11/2016 | Bartling ................. B05C 19/06 |

FOREIGN PATENT DOCUMENTS

| | | | | |
|---|---|---|---|---|
| CN | 103068662 | A | | 4/2013 |
| CN | 103796896 | A | | 5/2014 |
| CN | 103796897 | A | | 5/2014 |
| CN | 107031667 | A | | 8/2017 |
| DE | 102013016881 | A1 | | 4/2015 |
| DE | 102013016881 | A1 | * | 4/2015 ............. B61C 15/10 |
| EP | 2379394 | A1 | | 10/2011 |
| FR | 1001707 | A | | 2/1952 |
| JP | S5643060 | A | | 4/1981 |
| JP | 2005075042 | A | | 3/2005 |
| JP | 2012121452 | A | | 6/2012 |
| RU | 2502623 | C1 | | 12/2013 |
| RU | 2674899 | C1 | * | 12/2018 |
| WO | 2013034740 | A1 | | 3/2013 |
| WO | 2015052307 | A1 | | 4/2015 |
| WO | WO-2015055610 | A1 | * | 4/2015 ........... B61C 15/102 |
| WO | WO-2018157252 | A1 | * | 9/2018 ............. B61C 15/08 |

OTHER PUBLICATIONS

International Search Report dated Jun. 3, 2019 for PCT/EP2019/055259 filed Mar. 4, 2019.
Austrian Office Action dated Oct. 19, 2018 for Application No. A 50181/2018 (4 pages).
Office Action dated Aug. 3, 2022 for corresponding Chinese Patent application No. 201980015699 (12 pages).
Written Opinion dated Jul. 1, 2019 for PCT/EP2019/055259 (12 pages).

* cited by examiner

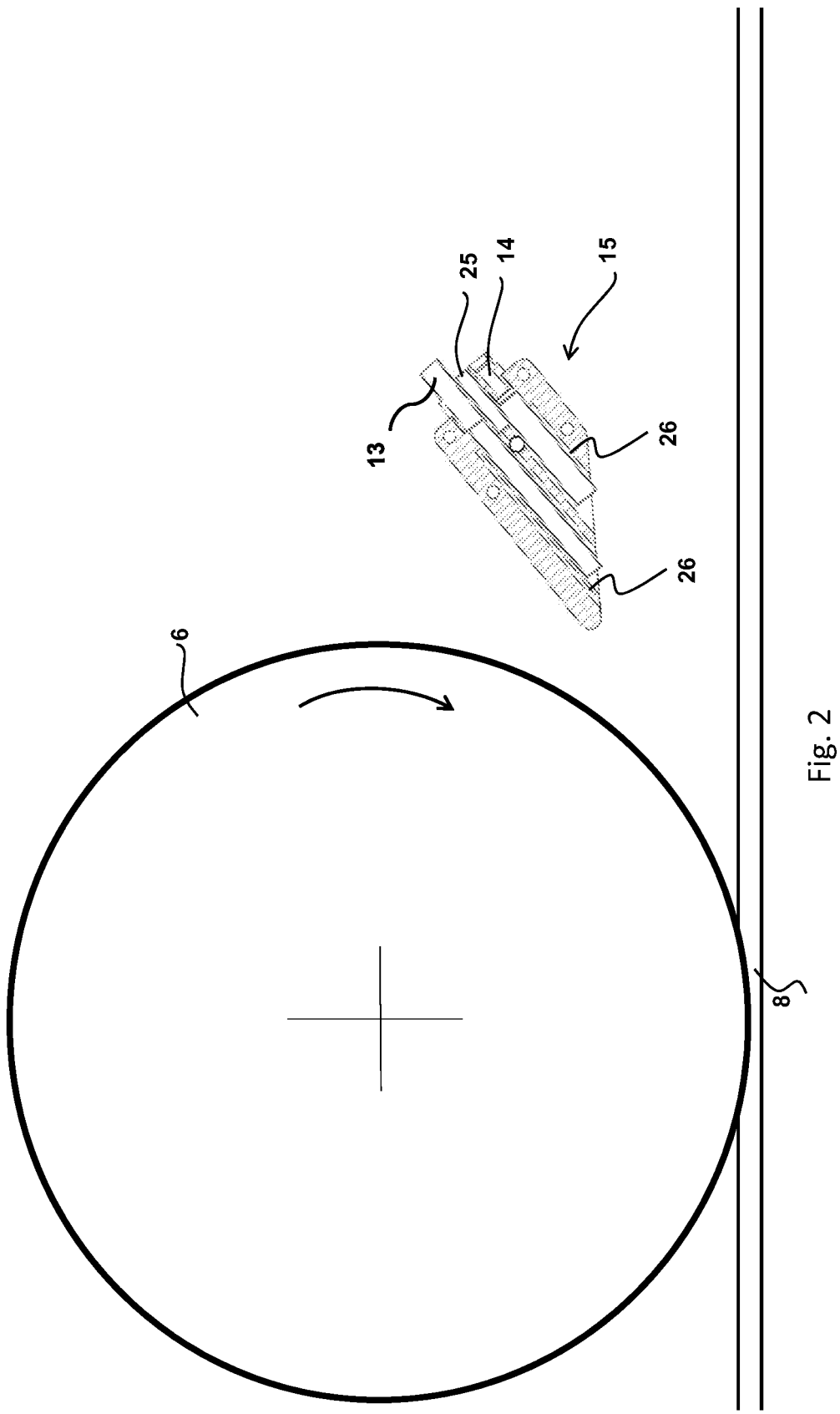

DEVICE AND METHOD FOR DISPENSING A FRICTION-COEFFICIENT-OPTIMIZING MIXTURE

FIELD OF THE INVENTION

The invention relates to a device for dispensing a friction-coefficient-optimizing mixture of at least one lubricant and at least one grit into the gap between a rail wheel of a rail vehicle and a rail, the device comprising at least one reservoir for the at least one lubricant, at least one reservoir for the at least one grit, at least one metering unit for metering the at least one lubricant, at least one metering unit for metering the at least one grit, at least one delivery apparatus for delivering the at least one lubricant, at least one delivery apparatus for delivering the at least one grit, and a common dispensing nozzle for dispensing the at least one lubricant and the at least one grit into the gap between the rail wheel and the rail.

The invention also relates to a method for dispensing a friction-coefficient-optimizing mixture of at least one lubricant and at least one grit into the gap between the rail wheel of a rail vehicle and the rail, wherein at least one lubricant is delivered out of at least one reservoir, metered via at least one metering unit, and via at least one delivery apparatus, and at least one grit is delivered out of at least one reservoir via at least one metering unit and at least one delivery apparatus to a common dispensing nozzle for dispensing the at least one lubricant and the at least one grit into the gap between the rail wheel and the rail.

BACKGROUND

The contact between the rail wheel and the rail plays an important role in the dynamics of a rail vehicle, since the driving and braking forces and the track-guiding and weight forces must be transmitted via a relatively small contact area. The friction ratio between the rail wheel and the rail defines the optimal force transmission. As soon as the rail vehicle moves, continuously changing conditions exist at the transition between the rail wheel and the rail. In addition to the amount of dirt, the track section profile, in particular on cornering, also plays an important role in the current condition at the contact point between the rail wheel and the rail. To minimize the extreme influences and the associated negative effects on the braking distance and wear (stick-slip effect), gritting and lubricating systems are used in rail vehicles.

For example, EP 2 379 394 B1 describes a system for scattering gritting material in front of the wheels of vehicles, in particular rail vehicles, in which the gritting material, in particular sand, can be introduced pneumatically into the gap between the wheel and the ground as required in order to increase the friction between the wheel and the ground and thereby reduce the braking distance and/or make it easier for the vehicle to set off.

With such conventional gritting apparatus, the efficiency of the dispensed amount depends greatly on the aerodynamic influences which arise directly in front of the gap between the wheel and the rail and tend to deflect the jet of grit outwards as the speed of the rail vehicle increases.

The use of lubricants to optimize the friction coefficient is also known to reduce the wear of the rail wheel and rail, inter alia in the region of the wheel flange, and to reduce noise, in particular during cornering or pendular movements of the rail vehicle.

For example, AT 515 059 B1 describes a metering apparatus for a wheel flange lubrication system of a rail vehicle, for metering and delivering a flowable lubricant.

For safety reasons, the use of the lubricant must not have negative effects on the length of the braking distance of the rail vehicle. To ensure this, solid particles are mixed into the lubricant. After a certain operating time, the two operating materials often become demixed owing to the driving dynamics. As a result, the characteristics of the lubricant as a whole can change. In addition, the high concentration of the solids can lead to blockage of the dispensing apparatus.

WO 2013/034740 A1 and WO 2015/52307 A1 disclose dispensing apparatus for mixtures of friction coefficient modifiers for a rail vehicle, in which multiple reservoirs are provided for friction coefficient modifiers of different materials and/or different sizes and/or different qualities in order to mix them as necessary and to apply a corresponding particle mixture to the rail. The particle mixture is introduced via a transporting apparatus through a delivery pipe into the gap between the rail wheel and the rail.

SUMMARY OF THE INVENTION

One aspect of the disclosure relates to a device and a method for dispensing a friction-coefficient-optimizing mixture which ensures efficient and fault-free dispensing of a friction-coefficient-optimizing mixture of at least one lubricant and at least one grit into the gap between the rail wheel of a rail vehicle and the rail. The device and the method should function as reliably and safely as possible, and demixing of the components of the friction-coefficient-optimizing mixture should be prevented. Disadvantages of known devices and methods should be avoided or at least reduced.

In an embodiment, a device in which the delivery apparatus for delivering the at least one lubricant and the delivery apparatus for delivering the at least one grit are separate from each other and end in the common dispensing nozzle so that the friction-coefficient-optimizing mixture is not formed from the at least one lubricant and the at least one grit until it is dispensed into the gap between the rail wheel and the rail, and an additional compressed air line is provided, which ends in the common dispensing nozzle. According to the invention, therefore, the mixing of the at least one lubricant and the at least one grit to form the friction-coefficient-optimizing mixture only takes place at the direct point of action, that is, on dispensing into the gap between the rail wheel and the rail, in the common dispensing nozzle. As a result, demixing of the at least two components of the friction-coefficient-optimizing mixture can be prevented and an optimal use of the desired amount of lubricant and grit depending on the case in question can be ensured. Generally, one lubricant and one grit are mixed. However, it is also possible for more lubricants and more grits to be used and mixed to form the friction-coefficient-optimizing mixture. The device according to the invention allows optimal portioning of the at least two components of the friction-coefficient-optimizing mixture, which is mixed preferably depending on the respective actual condition at the transition between the rail wheel and the rail and is introduced at an appropriate dispensing speed and dispensing energy into the gap between the rail wheel and the rail. The delivery lines of the at least two components, the lubricant and the grit, of the friction-coefficient-optimizing mixture run separately from the respective reservoir to the common dispensing nozzle. The metering of the lubricants and grits can be carried out individually and independently of one another. Thanks to the additional and autonomous compressed air line, the dispensing energy of the jet of friction-coefficient-optimizing mixture can be increased and the components of the friction-coefficient-optimizing mixture can be delivered into the gap between the rail wheel and the rail in a more concentrated manner.

According to one feature of the invention, the at least one metering unit for the at least one lubricant and/or the at least one metering unit for the at least one grit is formed by at least one cell wheel. A cell wheel is an implementation option for a metering unit. Of course, a pump can also be used to deliver a liquid lubricant.

The at least one metering unit for the at least one lubricant and/or the at least one metering unit for the at least one grit can likewise be formed by at least one piston. This is an alternative or an additional variant for a metering unit. The piston can in particular be combined with an electromagnet or a cylinder as a drive means.

The at least one delivery apparatus for delivering the at least one lubricant and/or the at least one delivery apparatus for delivering the at least one grit is preferably formed by a compressed air source and a compressed air line. The use of compressed air to deliver the at least one lubricant and the at least one grit has proven particularly reliable and efficient.

It is further advantageous if the additional compressed air enters the dispensing nozzle around the openings for the grit and the lubricant, which is advantageous in terms of the delivery and efficiency of the dispensing of the friction-coefficient-optimizing mixture. The friction-coefficient-optimizing mixture is effectively protected by the compressed air surrounding it, as a result of which influences such as side wind causes less deflection of the jet. Preferably, the opening of the compressed air lines of the dispensing nozzle is arranged in a ring around the openings for the at least one grit and the at least one lubricant.

If a control unit which is connected to each metering unit and each delivery apparatus is provided, optimal metering of the individual components of the friction-coefficient-optimizing mixture, that is, of the at least one lubricant and the at least one grit, can be achieved. The friction-coefficient-optimizing mixture can be mixed and metered on the basis of stored data or according to rules so that an optimal use and an optimal effect for optimal friction between the wheel and the rail can always be guaranteed.

Ideally, the control unit is connected to a sensor for sensing the speed of the rail vehicle, sensors for sensing environmental parameters and/or sensors for sensing the friction coefficient between the rail wheel and the rail. This creates a control loop which provides closed-loop control of the metering of the constituents of the friction-coefficient-optimizing mixture on the basis of influencing parameters such as environmental parameters and/or the actual condition of the contact between the rail wheel and the rail and in particular the speed of the rail vehicle. As environmental parameters, influencing factors such as temperature, humidity, wind speed etc. can be sensed and taken into account in the closed-loop control. This always ensures the use of an optimal amount and optimal composition of the at least one lubricant and the at least one grit depending on the case in question. The friction coefficient between the rail wheel and the rail can be determined by measuring the current condition in the gap between the rail wheel and the rail with the aid of suitable algorithms. The connection of the control unit to a device for sensing the position of the rail vehicle, for example a GPS receiver, can also be used for position-dependent metering of the lubricant and grit.

At least one lubricant can be formed by a preferably biodegradable liquid. Suitable lubricants are in particular liquids which optimally protect the rail flank and the rail head and the wheel flange of the rail wheel and minimize wear and noise. To prevent environmental pollution by the dispensing of the friction-coefficient-optimizing mixture, it is advantageous if the liquid is biodegradable. For example, lubricants which contain ceramic lubricants and synthetic carriers are used. Lubricants in solid form or in the form of capsules which contain the liquid lubricant are also conceivable.

Alternatively or additionally, at least one lubricant can also be formed by a preferably biodegradable solid. Solids in combination with liquid lubricant or without being mixed with liquid lubricants also come into consideration.

According to a further feature of the invention, at least one grit is formed by sand, preferably quartz sand. Sand is associated with low costs and virtually unlimited availability. Of course, the use of other grits, such as slags, aluminium oxide or synthetically produced granules, is likewise conceivable.

With respect to the method according to the disclosure, at least one lubricant and the at least one grit are metered and delivered to the common dispensing nozzle separately from each other so that the friction-coefficient-optimizing mixture is not formed from the at least one lubricant and the at least one grit until it is dispensed into the gap between the rail wheel and the rail, and compressed air in an additional compressed air line is delivered into the common dispensing nozzle. Reference is made to the above description of the device for the advantages achievable thereby. Thanks to the additional compressed air, increased dispensing energy of the jet of friction-coefficient-optimizing mixture into the gap between the rail wheel and the rail is achieved.

As already described above in connection with the device, the at least one lubricant and/or the at least one grit is metered for example with at least one cell wheel and/or with at least one piston.

The at least one lubricant and/or the at least one grit is preferably delivered pneumatically by means of compressed air to the common dispensing nozzle.

Ideally, the at least one lubricant and/or the at least one grit is metered separately from each other via a control unit. As a result, the optimal composition of the friction-coefficient-optimizing mixture can always be achieved depending on the case in question and the smallest possible amount of lubricant and grit for optimal use can be dispensed.

If the metering and delivery of the at least one lubricant and the at least one grit are controlled depending on the speed of the rail vehicle, on sensed environmental parameters and/or on the sensed friction coefficient between the rail wheel and the rail, an optimal composition of the friction-coefficient-optimizing mixture and optimal setting of the amount can be made depending on the measured events and conditions in each case. The geographical position of the rail vehicle can also be included in the closed-loop control.

A preferably biodegradable liquid and/or a preferably biodegradable solid can be used as at least one lubricant.

Sand, preferably quartz sand, can be used as at least one grit.

BRIEF DESCRIPTION OF THE DRAWINGS

The present invention is explained in more detail using the attached drawing. In the figures:

FIG. 2 shows a detailed view of a preferred embodiment of a common dispensing nozzle in a cut-away diagram.

DETAILED DESCRIPTION

Figure 1:
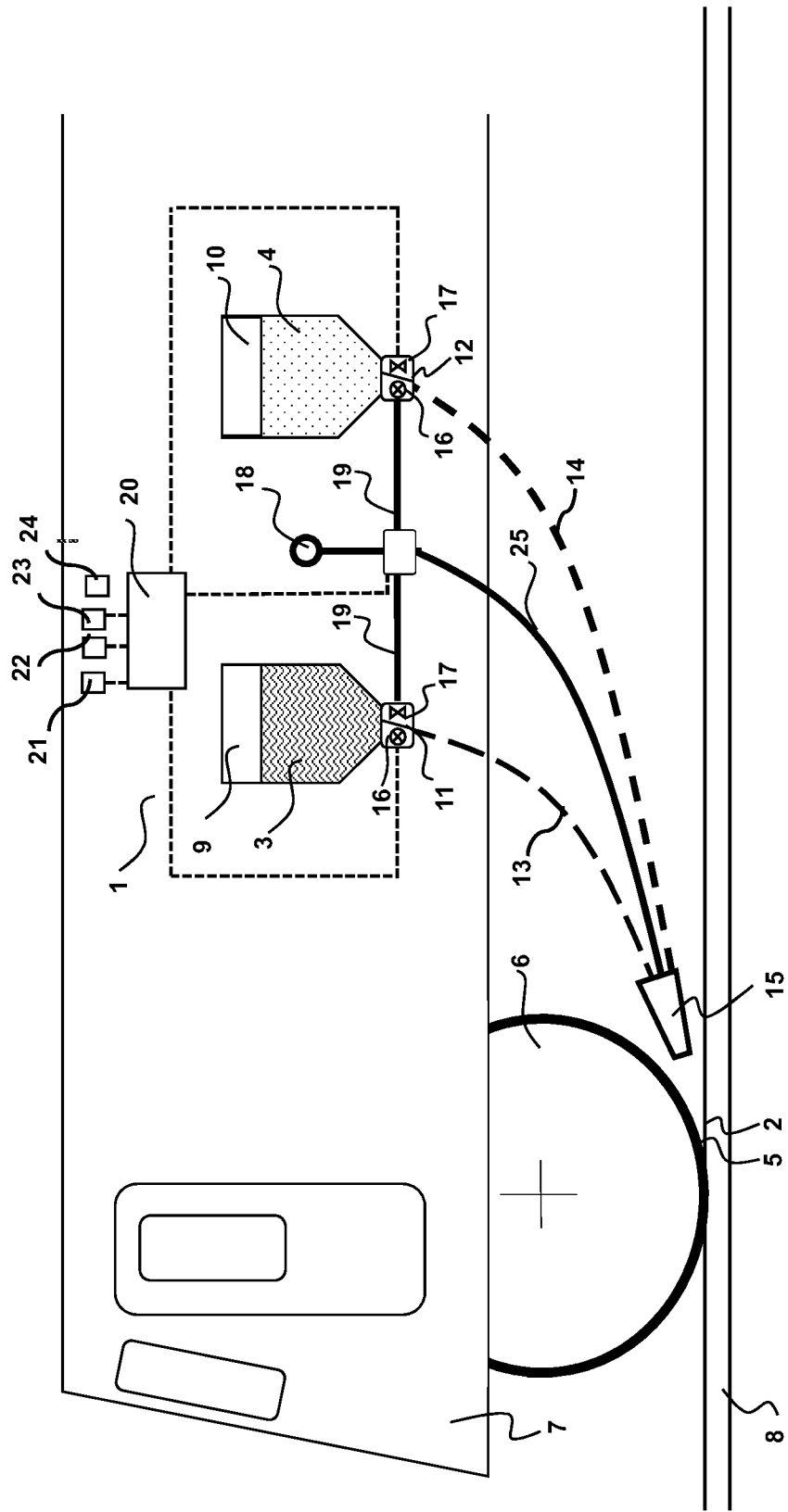
FIG. 1 shows a preferred embodiment of a device for dispensing a friction-coefficient-optimizing mixture of at least one lubricant and at least one grit into the gap of a rail vehicle and the rail.

FIG. 1 shows a device 1 for dispensing a friction-coefficient-optimizing mixture 2 of at least one lubricant 3 and at least one grit 4 into the gap 5 between the rail wheel 6 of a rail vehicle 7 and the rail 8. A reservoir 9 is provided for each lubricant 3 and a reservoir 10 is provided for each grit 4. If multiple lubricants 3 and multiple grits 4 are used, a corresponding number of reservoirs 9 and 10 are provided. The lubricant 3 can be metered in the desired amount into a downstream delivery apparatus 13 via a metering unit 11. The metering unit 12 can be formed for example by a pump (not shown), a cell wheel 16 or a piston 17.

A metering unit 12 for metering the grit 4 is also arranged under each reservoir 10 for the grit 4, can also be formed by a cell wheel 16 or a piston 17 and meters a desired amount of the grit 4 into the delivery apparatus 14. The delivery apparatus 13, 14 for conveying the at least one lubricant 3 and the at least one grit 4 end in a common dispensing nozzle 15, which is arranged at a suitable point in front of the rail wheel 6 of the rail vehicle 7. The metered amount of lubricant 3 and grit 4 which form the friction-coefficient-optimizing mixture 2 can thereby be introduced optimally into the gap 5 between the rail wheel 6 of the rail vehicle 7 and the rail 8. A compressed air source 18 and a compressed air line 19 can be used in each case to deliver the at least one lubricant 3 and the at least one grit 4.

An improvement in the dispensing of the friction-coefficient-optimizing mixture 2 is achieved by means of an additional and autonomous compressed air line 25 which is branched off from the compressed air source 18 and ends in the common dispensing nozzle 15.

Preferably, a control unit 20 is provided, which is connected to each metering unit 11, 12 and each delivery apparatus 13, 14. Optimal metering and mixing of the components of the friction-coefficient-optimizing mixture 2 can thereby be achieved, if necessary taking into account influencing factors and environmental parameters. To this end, the control unit 20 can be connected to a sensor 21 for sensing the speed v of the rail vehicle 7 and to sensors 22 for sensing environmental parameters such as temperature, humidity or wind speed. Finally, the control unit 20 can also be connected to sensors 23 for sensing the condition between the rail wheel 6 and the rail 8. Such sensors 23 can be formed for example by optical apparatus. The values sensed with these sensors 23 can be used to determine the friction coefficient μ between the rail wheel 6 and the rail 8 with the aid of suitable algorithms. Furthermore, a GPS receiver 24 can be connected to the control apparatus 20 in order to be able to sense the current geographical position of the rail vehicle 7 and also to be able to carry out closed-loop control of the dispensing of the friction-coefficient-optimizing mixture 2 on the basis of the position of the rail vehicle 7.

The at least one lubricant 3 is preferably formed by a biodegradable liquid and/or a preferably biodegradable solid. The at least one grit 4 is preferably formed by sand, e.g. quartz sand.

The device 1 according to the invention for dispensing a friction-coefficient-optimizing mixture 2 of at least one lubricant 3 and at least one grit 4 into the gap 5 between the rail wheel 6 of a rail vehicle 7 and the rail 8 is characterized by the optimal use of the components of lubricant and grit for an optimal effect, i.e. an optimal friction ratio between the wheel 6 and the rail 8. The separate delivery of the at least one lubricant 3 and the at least one grit 4 to the dispensing nozzle 15 and the preferred use of compressed air for the delivery means that mixing does not occur until directly before the friction-coefficient-optimizing mixture 2 is dispensed into the gap 5 between the rail wheel 6 and the rail 8, as a result of which demixing of the components can be prevented.

FIG. 2 shows a detailed view of a preferred embodiment of a common dispensing nozzle 15 in a cut-away diagram. The lines of the delivery apparatus 13 for delivering the lubricant 3, lines of the delivery apparatus 14 for delivering the grit 4, and the additional compressed air line 25 end in the dispensing nozzle 15. The compressed air ends in an annular gap 26 which is preferably arranged in a ring around the openings for the lubricant 3 and the grit 4. The friction-coefficient-optimizing mixture 2 is thereby protected by the compressed air jet surrounding it, as a result of which the friction-coefficient-optimizing mixture 2 can be dispensed into the gap between the rail wheel 6 and the rail 8 in a more efficiently targeted manner. Instead of a circularly surrounding opening of the additional compressed air line 25, an opening for the compressed air can also be arranged above the opening for the lubricant 3 and below the opening for the grit 4.

The invention claimed is:

1. A device for dispensing a mixture of at least one lubricant and at least one grit into a gap between a rail wheel of a rail vehicle and a rail, the device comprising:
   at least one lubricant reservoir for the at least one lubricant;
   at least one grit reservoir for the at least one grit;
   at least one lubricant metering unit for metering the at least one lubricant;
   at least one grit metering unit for metering the at least one grit;
   at least one lubricant delivery line for delivering the at least one lubricant;
   at least one grit delivery line for delivering the at least one grit;
   a nozzle-terminating compressed air line for delivering compressed air; and
   a common dispensing nozzle that receives the at least one lubricant delivery line, the at least one grit delivery line, and the nozzle-terminating compressed air line for dispensing the at least one lubricant and the at least one grit into the gap between the rail wheel and the rail using the compressed air, wherein the at least one lubricant delivery line and the at least one grit delivery line are separate from each other and end in the common dispensing nozzle so that the mixture is not formed from the at least one lubricant and the at least one grit until the mixture is dispensed into the gap between the rail wheel and the rail, and the mixture is prevented from demixing.

2. The device according to claim 1, wherein the at least one lubricant metering unit, the at least one grit metering unit, or the at least one lubricant metering unit and the at least one grit metering unit are formed by at least one cell wheel.

3. The device according to claim 1, wherein the at least one lubricant metering unit, the at least one grit metering unit, or the at least one lubricant metering unit and the at least one grit metering unit are formed by at least one piston.

4. The device according to claim 1, wherein the at least one lubricant delivery line, the at least one grit delivery line, or the at least one lubricant delivery line and the at least one grit delivery line are formed by a compressed air source and a compressed air line.

5. The device according to claim 1, further comprising:
a control unit connected to the at least one lubricant metering unit, the at least one grit metering unit, the at least one lubricant delivery line, and the at least one grit delivery line.

6. The device according to claim 5, wherein the control unit is connected to a global positioning system (GPS) receiver configured to determine a location of the rail vehicle, the control unit configured to control one or both of the at least one lubricant metering unit or the at least one grit metering unit for position-dependent metering of the lubricant, the grit, or both the lubricant and the grit.

7. The device according to claim 1, wherein the at least one lubricant includes a biodegradable liquid.

8. The device according to claim 1, wherein the at least one lubricant includes a biodegradable solid.

9. The device according to claim 1, wherein the at least one grit includes sand.

10. A method for dispensing a mixture of at least one lubricant and at least one grit into a gap between a rail wheel of a rail vehicle and a rail, the method comprising:
delivering the at least one lubricant out of at least one lubricant reservoir via at least one lubricant metering unit and a lubricant delivery line that ends in a common dispensing nozzle;
delivering the at least one grit out of at least one grit reservoir via at least one grit metering unit and at least one grit delivery line that ends in the common dispensing nozzle; and
dispensing the at least one lubricant and the at least one grit from the lubricant delivery line and the at least one grit delivery line that end in the common dispensing nozzle into the gap between the rail wheel and the rail such that demixing of the at least one lubricant and the at least one grit is prevented,
wherein the at least one lubricant and the at least one grit are metered and delivered to the common dispensing nozzle separately from each other.

11. The method according to claim 10, wherein the at least one lubricant, the at least one grit, or the at least one lubricant and the at least one grit are metered using at least one cell wheel.

12. The method according to claim 10, wherein the at least one lubricant, the at least one grit, or the at least one lubricant and the at least one grit are metered using at least one piston.

13. The method according to claim 10, wherein the at least one lubricant, the at least one grit, or the at least one lubricant and the at least one grit are delivered pneumatically by compressed air to the common dispensing nozzle.

14. The method according to claim 10, wherein the at least one lubricant and the at least one grit are metered separately from each other via a control unit.

15. The method according to claim 14, wherein metering and delivery of the at least one lubricant and the at least one grit are controlled based on one or more of a speed of the rail vehicle, sensed environmental parameters, or on a sensed friction coefficient between the rail wheel and the rail.

16. The method according to claim 10, wherein a biodegradable liquid is used as the at least one lubricant.

17. The method according to claim 10, wherein a biodegradable solid is used as the at least one lubricant.

18. The method according to claim 10, wherein sand is used as the at least one grit.

19. A mixture dispensing device, comprising:
a common nozzle configured to direct a lubricant and a grit into a gap between a wheel of a vehicle and a rail;
a lubricant line that ends in the common nozzle;
a grit line that ends in the common nozzle;
a lubricant metering device configured to meter and direct the lubricant from a lubricant reservoir to the common nozzle via the lubricant line separate from the grit; and
a grit metering device configured to meter and direct the grit from a grit reservoir to the common nozzle via the grit line separate from the lubricant, wherein the lubricant line and the grit line end in the common nozzle to prevent demixing of a mixture of the lubricant and the grit that is dispensed from the common nozzle.

20. The mixture dispensing device of claim 19, further comprising:
a control unit configured to control operation of one or both the lubricant metering device or the grit metering device based on a location of the vehicle.

* * * * *